United States Patent
Mayer et al.

(10) Patent No.: US 9,738,385 B2
(45) Date of Patent: Aug. 22, 2017

(54) PARTITION ELEMENT FOR AN AIRCRAFT CABIN AND CABIN ARRANGEMENT

(71) Applicant: Airbus Operations GmbH, Hamburg (DE)

(72) Inventors: Tobias Mayer, Hamburg (DE); Paul Edwards, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 146 days.

(21) Appl. No.: 14/677,414

(22) Filed: Apr. 2, 2015

(65) Prior Publication Data

US 2015/0284082 A1 Oct. 8, 2015

(30) Foreign Application Priority Data

Apr. 4, 2014 (EP) .................................. 14163612

(51) Int. Cl.
*B64D 11/00* (2006.01)
*B64D 13/00* (2006.01)
(Continued)

(52) U.S. Cl.
CPC ...... *B64D 11/0023* (2013.01); *B64D 11/0639* (2014.12); *B64D 11/0693* (2013.01); *B64D 11/04* (2013.01)

(58) Field of Classification Search
CPC . B64D 11/0023; B64D 11/04; B64D 11/0639; B64D 11/0693
See application file for complete search history.

(56) References Cited

U.S. PATENT DOCUMENTS 3,423,121 A 1/1969 Lipkin
4,185,799 A 1/1980 Richards, Jr.
(Continued)

FOREIGN PATENT DOCUMENTS

DE 4014057 C1 10/1991
DE 10 2008 031 021 A1 1/2010
(Continued)

OTHER PUBLICATIONS

Extended European Search Report for Application No. 14163612.6 dated Oct. 9, 2014.
(Continued)

*Primary Examiner* — Philip J Bonzell
(74) *Attorney, Agent, or Firm* — Jenkins, Wilson, Taylor & Hunt, P.A.

(57) ABSTRACT

A aircraft cabin partition element and aircraft cabin arrangement, with a wall member having a lower edge and extending upwards from the lower edge provided with a coupling, capable of slidingly engaging a guide rail arrangement, an upper panel member pivotably mounted on the wall member with respect to a horizontal axis which is spaced from the lower edge, the upper panel member pivotable between a first position where the upper panel member extends from the horizontal axis towards the lower edge parallel to the wall member, and a second position where the upper panel member extends away from the wall member, and a support member movably mounted on the wall member and movable between a support position supporting the upper panel member when in the second position to prevent pivoting towards the wall member to the first position, and a storage position extending parallel to the wall member.

14 Claims, 2 Drawing Sheets

(51) Int. Cl.
  *B64D 11/06* (2006.01)
  *B64D 11/04* (2006.01)

(56) References Cited

U.S. PATENT DOCUMENTS

| | | | |
|---|---|---|---|
| 4,597,549 | A | 7/1986 | Ryan |
| 4,899,962 | A | 2/1990 | Mueller |
| 5,577,358 | A | 11/1996 | Franke |
| 5,816,534 | A | 10/1998 | Schumacher |
| 8,613,407 | B2 | 12/2013 | Hartel |
| 9,073,640 | B2 * | 7/2015 | Mosler ............... B64D 11/0023 |
| 9,120,573 | B2 * | 9/2015 | Ehlers ............... B64D 11/0007 |
| 9,227,728 | B2 * | 1/2016 | Schimanowski ...... B64D 11/04 |
| 2003/0127562 | A1 | 7/2003 | Pereira |
| 2009/0224103 | A1 | 9/2009 | Neumann |
| 2011/0114788 | A1 | 5/2011 | Mosler |
| 2012/0043028 | A1 | 2/2012 | Roach |
| 2013/0082140 | A1 * | 4/2013 | Ehlers ............... B64D 11/0007 244/118.5 |
| 2014/0217239 | A1 | 8/2014 | Ehlers et al. |
| 2015/0284083 | A1 | 10/2015 | Mayer |
| 2015/0284084 | A1 | 10/2015 | Mayer |

FOREIGN PATENT DOCUMENTS

| | | |
|---|---|---|
| DE | 10 2011 109 390 A1 | 2/2013 |
| EP | 0754621 A1 | 1/1997 |
| EP | 0850833 A2 | 7/1998 |
| EP | 0708018 B1 | 8/1998 |
| EP | 1125520 A1 | 8/2001 |
| EP | 1118537 A2 | 7/2007 |
| GB | 903956 A | 8/1962 |
| WO | WO-2010/084048 A1 | 7/2010 |

OTHER PUBLICATIONS

Extended European Search Report for Application No. 14163618 dated Sep. 17, 2014.
Extended European Search Report for Application No. 1416 3607.6 Nov. 14, 2014.

\* cited by examiner

PARTITION ELEMENT FOR AN AIRCRAFT CABIN AND CABIN ARRANGEMENT

CROSS-REFERENCE TO RELATED APPLICATION

This application claims priority to European Patent Application No. 14163612.6 filed Apr. 4, 2014, the entire disclosure of which is incorporated by reference herein.

TECHNICAL FIELD

The present disclosure relates to a partition element for an aircraft cabin comprising a wall member having a lower edge and extending upwards from the lower edge as well as an aircraft cabin arrangement.

BACKGROUND

Partition elements for aircraft cabins are well known in the art and employed to separate sections of the cabin so as to prevent passengers from looking through the entire cabin and to optically screening different sections in the cabin. Such a partition element is known from EP 0 708 018 B1.

Further, it is also known to combine partition elements with other monuments in the cabin such as galleys, lavatories or storage means. However, these latter elements are fixedly mounted in the cabin and require space which cannot be used for other purposes.

Moreover, smaller and medium sized aircrafts are employed for trips with flight times varying, according to different business models, between one and six hours, and it depends on the length of the particular route the aircraft is used for how many food and beverages have to be taken on board to be offered to the passengers during that flight. If it is a rather short trip with a flight time of about one hour only a small amount of food is required whereas in case of flight times greater than two hours more catering food needs to be stored in the cabin.

In addition, it is quite common that a particular aircraft is used for trips of different length even on the same day so that the space required for catering food may vary from flight to flight. This in turn leads to the drawback that in case of short flights space for catering food is provided which is for that particular trip not required and could be used for other purposes.

SUMMARY

Therefore, it is an object of the present disclosure to provide a partition element which allows to flexibly use the space in the cabin of an aircraft. In addition, it is a further object of the present disclosure to provide a cabin arrangement which can be quickly adapted to different space requirements for payload required during the flight in the cabin such as catering food.

According to a first aspect of the present disclosure this object is achieved by a partition element for an aircraft cabin comprising:

- a wall member having a lower edge and extending upwards from the lower edge which is provided with a coupling arrangement, that is designed such that it is capable of slidingly engaging a guide rail arrangement in a floor,
- an upper panel member pivotably mounted on the wall member with respect to a horizontal axis which is spaced from the lower edge, wherein the upper panel member is pivotable between a first position in which the upper panel member extends from the horizontal axis towards the lower edge parallel to the wall member, and a second position in which the upper panel member extends away from the wall member, and
- a support member movably mounted on the wall member such that it is movable between a support position in which it supports the upper panel member when being in the second position so as to prevent it from pivoting towards the wall member to the first position, and a storage position in which it extends parallel to the wall member.

Firstly, the partition element of the present disclosure comprises an upwardly towards the cabin ceiling extending wall member which is provided with a coupling arrangement that is adapted such that it can slidably engage with guide rails such as seat rails in the floor of an aircraft cabin. This allows to easily change the position of the partition element in the longitudinal direction of the cabin and it is not fixed.

Further, the upper panel element mounted on the upwardly extending wall member can be pivoted between a first or storage position in which it is arranged essentially parallel to the wall member, i.e. it does not project away from the wall member and the entire partition element requires a small amount of space. However, when the upper panel member is pivoted to the second position in which it projects preferably horizontally from the wall member and is maintained in this position by the support member, storage space is formed beneath the upper panel member which can be used for catering trolleys.

When the partition element of the present is positioned adjacent to a door, the coupling arrangement allows to shift it away from the door to such an extent that it is possible to pivot the upper panel towards the second position without impeding access to the door whereas the partition element can be shifted to a position closer to the door when the upper panel is in the first position pivoted downwards to be aligned with the wall element.

In particular, when the seat rows directly adjacent to the partition element on that side of the wall member opposite to the upper panel are formed as foldable seats, the additional space required for the unfolded partition element can easily be gained by folding the seats of this row into the collapsed state.

In a preferred embodiment, the wall member comprises an upper edge opposite to the lower edge and the upper edge comprises a fixing device capable of being fixed to a support element above the wall member. This allows fixing the partition element on respective connectors on the hatrack of an aircraft cabin to further stabilize the partition element.

Moreover, it is preferred that the support member is formed as a first lateral panel member pivotably mounted on the wall member with respect to a first pivot axis extending perpendicularly to the horizontal axis, the first lateral panel member being arranged between the horizontal axis and the lower edge. If the partition element is configured in this way, the space below the upper panel member is laterally screened, at least from one side. At the same time, the lateral panel member reliably supports the upper panel member. Here, in a further preferred embodiment, the first pivot axis with respect to which the first lateral panel may pivot, is aligned with a first lateral edge of the upper panel member. This means that the first pivot axis and the respective lateral edge of the upper panel adjacent to the wall member are at the same position with respect to the direction defined by the horizontal axis. Such an arrangement ensures that the space directly beneath the upper panel member can entirely be used as storage and no support is arranged inside this space so that its availability is not impeded.

Furthermore, in a preferred embodiment a second lateral panel member is provided which is pivotably mounted on the wall member with respect to a second pivot axis, the second pivot axis being aligned with a second lateral edge of the upper panel member opposite to the first lateral edge. Thus, the pivot axis of the second lateral panel is located at the same horizontal position as the lateral edge of the upper panel member so that the second panel member is not positioned inside the space below the upper panel member either, when the upper panel member is in the second position. In addition, this space is screened from both sides and there is no access from the side to it.

In order to ensure that when the upper panel is in the second position in which it projects away from the wall member, the space below it is completely screened from the side, it is preferred that the length of the first and/or second lateral panel members perpendicular to the pivot axis of the respective lateral panel member corresponds to the length of the upper panel member perpendicular the horizontal axis. In this regard it is to be noted that when the edge of the upper panel member opposite the horizontal axis does extend in parallel to the horizontal axis, the length of a lateral panel should correspond to the length of the respective lateral edge of the upper panel.

It is further preferred that the lower edges of first and/or second lateral panel members are parallel to the lower edge of the wall member. This ensures a lateral screening over the entire height of the space below the upper panel member when being in its upwardly pivoted second position.

In a preferred embodiment the first and/or the second lateral panel members are provided with engagement devices which are adapted to be releasably coupled with engagement elements in the floor. This allows to reliably secure the lateral panel members when supporting the upper panel member.

Further, it is preferred that the partition element is provided with a frame comprising an upper frame member that is attached to the wall member. The upper panel member is then pivotably coupled with the upper frame member so that the horizontal axis is spaced from the wall member. In such an arrangement a cavity is formed between the wall member and the upper panel member when the latter is in the first position, i.e. extends parallel to the wall member. In this cavity the first and/or the second lateral panel member can be received.

In such an arrangement it is further preferred when the frame comprises a first lateral frame member which extends perpendicularly to the upper frame member and is aligned with a lateral edge of the upper panel member, wherein the first lateral panel member is pivotably coupled with the first lateral frame member so that the pivot axis of the first lateral panel member is spaced from the wall member by a distance different from the distance between the horizontal axis and the wall member. This allows that when the upper panel member is in the first position and extends parallel to the wall member, the first lateral member can also be pivoted towards the wall member into a position in which it is arranged parallel to the wall member as well.

Finally, in a further preferred embodiment the frame comprises a second lateral frame member which extends parallel to the first lateral frame member and is aligned with a second lateral edge of the upper panel member opposite to the first lateral edge so that the space below the upper frame member is screened from both lateral sides which results in an advantageous appearance of the entire partition when the upper panel member is in the first position and the lateral panel members are pivoted towards the wall member so that the assembly of the panel members is in the collapsed state.

Furthermore, the above object is also achieved by an aircraft cabin arrangement comprising:

a floor which is provided with a guide rail arrangement extending along a longitudinal axis defined by the cabin arrangement;

a plurality of seat rows, each row comprising at least one seat and being arranged on the floor perpendicularly to the longitudinal axis, wherein the seat rows are arranged one after another;

a partition element as described above, wherein the coupling arrangement slidingly engages the guide rail arrangement and the horizontal axis is arranged parallel to the floor;

at least one row of foldable seats comprising at least one foldable seat and being arranged on the floor perpendicularly to the longitudinal axis wherein the foldable seats comprise a seating area and a back rest, wherein the foldable seats are adapted such that they can be folded and unfolded between a collapsed state in which the seating area extends parallel to the back rest, and an unfolded state in which the seating area extends in a plane parallel to the floor, and wherein the at least one row of foldable seats is arranged between the plurality of seat rows and the partition element.

In such a cabin arrangement the partition element according to the present disclosure is slidable along the guide rail arrangement between a first axial position and a second axial position and the cabin arrangement may assume first and second configurations.

In the first axial position the partition element is spaced from the plurality of seat rows by a first distance and in the second axial position by a second distance, the second distance being smaller than the first distance.

Further, in the first configuration the partition element is in the first axial position and the foldable seats of the at least one row of foldable seats are in the unfolded state, whereas in the second configuration the partition element is in the second axial position and the foldable seats of the at least one row of foldable seats are in the collapsed state. Thus, when the cabin arrangement is in the first configuration, i.e. the foldable seats are in the unfolded state, the partition element is in its first axial position spaced from the plurality of seat rows. In this configuration the upper panel of the partition element is in the first position, i.e. extends parallel to the wall member so that the partition element is not effective as storage.

However, in the second configuration of the cabin arrangement, when the seats of the row of foldable seats are in the collapsed state so that the partition element can be slit to the second axial position closer to the plurality of seat rows, additional space is created. This space can be used to pivot the upper panel member to its second position and support it in this position by the support member, preferably in the form of lateral panel members. Then, the partition element is also effective as storage.

Further, as it is neither complicated nor time-consuming to switch in the cabin arrangement of the present from the first configuration to the second configuration, it is easily possible to gain either more storage, e.g. for additional catering food for longer trips, or additional seats when the storage is not required. Thus, even during a stopover, the cabin arrangement can quickly be changed from one to the other configuration and can be adapted to the actual requirements in terms of storage needed in the cabin.

Finally, it is preferred that the difference between the first and the second distances is equal or greater than the length of the upper panel member perpendicular to the horizontal axis. This ensures that empty space gained when the partition is shifted from the first to the second axial position is sufficient to receive the storage formed by the upper panel member when being pivoted to the second position.

BRIEF DESCRIPTION OF THE DRAWINGS

In the following, a preferred embodiment of an aircraft cabin arrangement with a partition element of the present disclosure is described in detail by a drawing. The drawing shows in FIG. 1 a perspective view of the preferred embodiment being in the first configuration, FIG. 2 a top view on the partition element of FIG. 1, FIG. 3 a first perspective view of the preferred embodiment being in the second configuration, and FIG. 4 a second perspective view of the preferred embodiment being in the second configuration.

DETAILED DESCRIPTION

Figure 1:
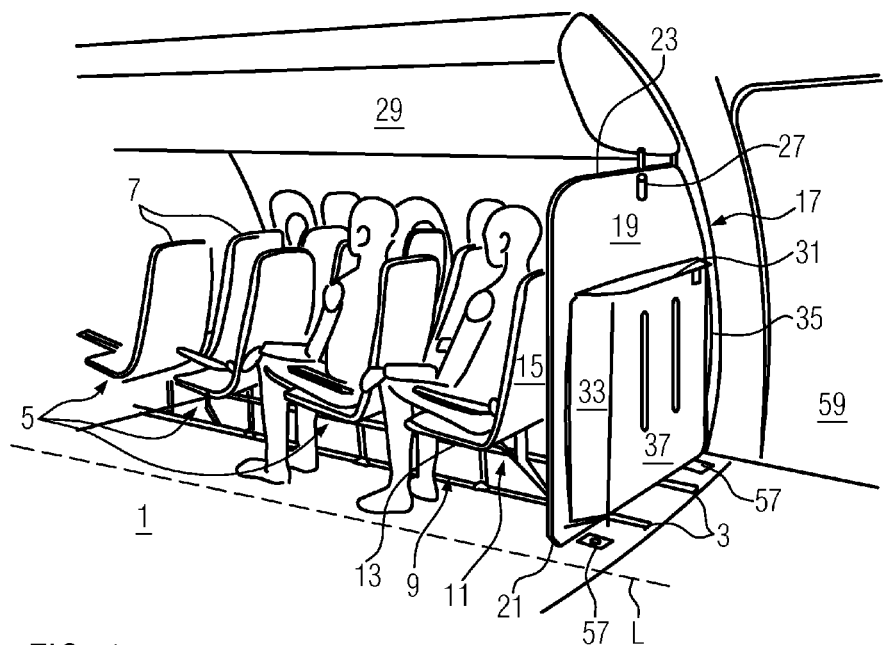

FIG. 1 shows a preferred embodiment of an aircraft cabin arrangement of the present disclosure when the arrangement is in a first configuration.

The embodiment of an aircraft cabin arrangement defines a longitudinal axis L and comprises a floor 1 which is provided with a guide rail arrangement comprising first and second guide rails 3 extending in parallel to each other and to the longitudinal axis L. Further, a plurality of seat rows 5 is provided in the cabin arrangement and each row 5 comprises in this embodiment three adjacent seats 7 which are positioned on the floor 1 and fixed in the guide rails 3. The rows 5 extend perpendicularly to the longitudinal axis L and the guide rails 3 and are arranged one after another.

Figure 3:
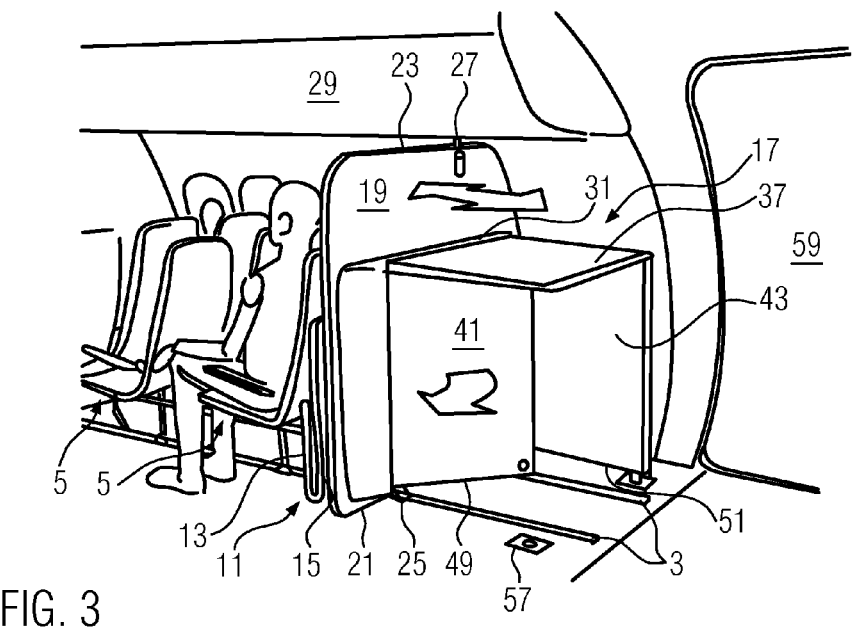

Furthermore, this embodiment comprises a row 9 of foldable seats 11 positioned on the floor 1 as well and being secured in the guide rails 3. The row 9 of foldable seats 11 extends also perpendicularly to the longitudinal axis L and the guide rails 3, respectively, and each of the foldable seats 11 comprises a seating area 13 and a back rest 15. As shown in FIGS. 1 and 3, the foldable seats 11 can be folded and unfolded between a collapsed state (FIG. 3) in which the seating area 13 extends parallel to the back rest 15, so that the entire seat 11 requires only a small amount of space parallel to the longitudinal axis L, and an unfolded state in which the seating area 13 extends in a plane parallel to the floor 1 (FIG. 1). In the collapsed state the foldable seats 11 can be slid towards an adjacent row 5 of seats 7 so as to provide free space which can be used for other purposes as will be described further herein.

Regarding the rows 5 of seats 7 it has to be noted that also these seats 7 can be formed as foldable seats which can be folded into a collapsed state.

Moreover, the embodiment of a cabin arrangement comprises a partition element 17 which is provided to separate the entire cabin into different sections and which prevents passengers from looking through the entire cabin so as to screen certain portions.

The partition element 17 is arranged on that side of the row 9 of foldable seats 11 opposite to the plurality of other seat rows 5 so that the row 9 of foldable seats 11 is arranged between the plurality of seat rows 5 and the partition element 17.

This partition element 17 which also forms an embodiment of the present disclosure, comprises a wall member 19 which projects upwardly from the floor 1 towards the cabin ceiling so that is arranged perpendicularly to the floor 1. The wall member 19 is planar so that it extends in a vertical plane and comprises a lower edge 21 and an upper edge 23 opposite to the lower edge 21. The lower edge 21 is provided with a coupling arrangement 25 which slidingly engages the guide rails 3 in the floor 1. Thus, the wall member 19 can axially be shifted in the cabin along the guide rails 3 parallel to the longitudinal axis L, and the position of the partition element 17 in the longitudinal direction L can easily be changed and it is not fixed.

Further, the upper edge 23 of the wall member 19 is provided with a fixing device 27 which can be fixed on an upper support element such as a hatrack 29 in the cabin arrangement, so that also the upper end of the wall member 19 can be secured and the entire wall member 19 will be stabilized in the upright position. It is also conceivable that an upper fixation rail is provided on the hatrack 29 in which the fixation element 27 slides and in which the element can be locked in a given axial position.

Furthermore, the partition element 17 is provided with a frame comprising an upper frame member 31 and first and second lateral frame members 33, 35. The first lateral frame member 33 is arranged on that side of the upper frame member 31 that points towards the center line or longitudinal axis L of the cabin whereas the second lateral frame member 35 extends from the opposite end of the upper frame member 31 facing towards the lateral cabin wall.

When the wall member 19 is arranged in the upright position in the cabin, the upper frame member 31 extends horizontally along the wall member 19 and the lateral frame members 33, 35 extend vertically downwardly towards the lower edge 21 from either end of the upper frame member 31, so that the lateral frame members 33, 35 are arranged perpendicularly to the upper frame member 31.

An upper panel member 37 is pivotably mounted on the wall member 19 in such a way that is hinged to the upper frame member 31 so it can pivot with respect to a horizontal axis 39 between a first position (FIG. 1) in which it extends from the horizontal axis 39 substantially parallel to the wall member 19 towards the lower edge 21 (FIGS. 1 and 2), and a second position in which the upper panel member 37 perpendicularly projects away from the wall member 19.

Figure 2:
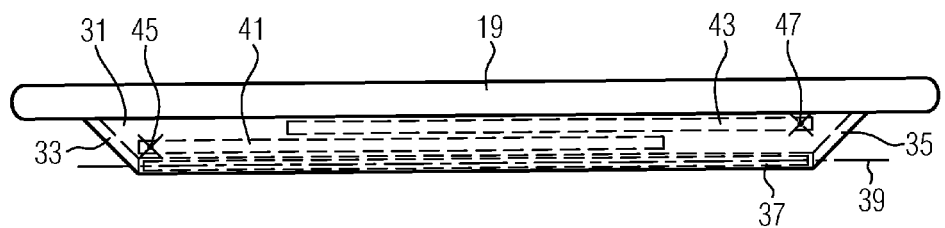

However, as shown in FIG. 2, the horizontal axis 39 is spaced from the wall member 19 so that when the upper panel member 37 is in the first position, it is spaced from the wall member 19 and a cavity is formed between the wall member 19 and the upper panel member 37.

In the second position, the upper wall member 37 extends horizontally parallel to the floor 1. It may be supported in this position by first and second lateral panel members 41, 43 which are pivotably mounted on the lateral frame member 33, 35, so that they are arranged between the horizontal axis and the lower edge. In particular, the first lateral panel member 41 is hinged on the first lateral frame member 33 so that it can pivot with respect to a first pivot axis 45 from the wall member 19 towards the center line of the cabin as indicated by the arrow in FIG. 3. The second lateral panel member 43 is hinged to the second lateral frame member 35 and can pivot with respect to a second pivot axis 47 from the wall member 19 towards the lateral wall of the cabin away from the center line. Both the first and the second pivot axes 45, 47 extend perpendicularly to the horizontal axis 39 and are aligned with lateral edges of the upper panel member 37. This means that the pivot axes 45, 47 and the respective lateral edges of the upper panel 37 adjacent to the wall member 19 are at the same position with respect to the direction defined by the horizontal axis 39. Thus, when the lateral panel members 41, 43 project perpendicularly away from the wall member 19 to support the upper panel member 37 in the second position, the lateral panel members 37 extend along the side edges of the upper panel member 37.

Further, as can be seen in FIG. 2, the first and second pivot axes 45, 47 are spaced from the wall member 19 and the distance is different from the distance of the horizontal axis 39 to the wall member 19. In particular, the distances of first and second pivot axes 45, 47 to the wall member 19 is smaller than distance of the horizontal axis 39, so that when the upper panel 37 is in the first position and pivoted downwardly, the lateral panel members 41, 43 are received in the cavity formed between the upper panel member 37 and the wall member 19.

In this preferred embodiment, the lateral panel members 41, 43 are effective as support members which are movably mounted on the wall member 19. When the lateral panel members 41, 43 are pivoted such that they extend perpendicularly away from the wall member 19, they are in a support position in which they support the lateral edges of the upper panel 37 and prevent the latter from pivoting downwardly towards the wall member 19, so that it is maintained in its second position. Further, when the lateral panel members 41, 43 are pivoted towards the wall member 19 so that they extend parallel to the wall member, the lateral panel members 41, 43 forming the support member, assume a storage position.

Finally, in this preferred embodiment the lower edges 49, 51 of the first and second lateral panel members 41, 43 are arranged parallel to the lower edge 21 of the wall member 19 and preferably at the same level. Further, the length of the first and second lateral panel members 41, 43 perpendicular to the pivot axis 45, 47 of the respective lateral panel members 41, 43 corresponds to the length of the upper panel 37 member perpendicular the horizontal axis 39. This configuration of the panel members 37, 41, 43 has the effect that when the upper panel member 37 extends horizontally, i.e. is in the second position, and it is supported by the lateral panel members 41, 41, the panel members 37, 41, 43 enclose a space and screen it which can be used as storage, e.g. for catering trolleys 53 (see FIG. 4). Further, in this space no support is arranged so that it can entirely be used as storage.

In order to secure the first and second lateral panel members 41, 43 in the pivot position where they project perpendicularly away from the wall member 19, they are provided with engagement devices 57 which are adapted to be releasably coupled with engagement elements 57 in the floor 1.

Even though it was described before that lateral panel members 41, 43 are employed as support members for the upper panel member 37 in the second horizontal position, the support members can be configured differently such a frame structure comprising pivotable struts etc.

Figure 4:
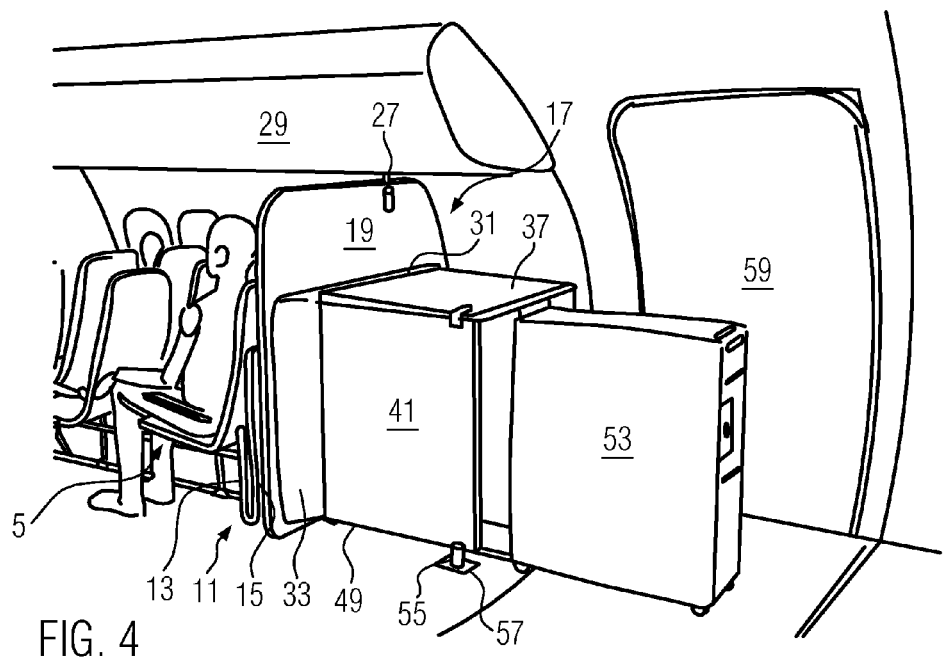

The above-described preferred embodiment of a cabin arrangement with the partition element 17 according to the present disclosure may easily be changed between first and second configurations shown in FIGS. 1 and 4.

In the first configuration (FIG. 1), the partition element 17 is in a first axial position relative to the longitudinal axis L in which position the wall member 19 is adjacent to a cabin door 55. The foldable seats 11 of the row 9 of foldable seats are in the unfolded state, and the upper panel member 37 of the partition element 17 is in the first position, i.e. extends parallel to the wall member 19 so that the lateral panel members 41, 43 are received in the cavity formed between the upper panel member 37 and the wall member 19, i.e. the partition element 17 is not effective as storage.

In the second configuration the partition element has been shifted to a second axial position remote from the cabin door 55 and closer to the plurality of seat rows 5 (see FIGS. 3 and 4). In order to gain the space for this shift, the foldable seats 11 of the row 9 of foldable seats were folded to the collapsed state before. In the first axial position the partition element is spaced from the seat rows 5 by a first distance whereas in this second axial position it is spaced by a second distance, the second distance being smaller than the first distance.

The space created by shifting the partition element 17 away from the door 59 can be used to pivot the upper panel member 37 to its second horizontal position and support it in this position by the support members in the form of the lateral panel members 41, 43 which are locked in this position via the engagement device 55 and the engagement element 57 (see FIGS. 3 and 4). Then, the partition element 17 becomes effective as storage, e.g. for the trolleys 53.

Finally, it is clear that when the difference between the above mentioned first and second distances is equal or greater than the length of the upper panel member 37 perpendicular to the horizontal axis 39, the empty space gained when the partition element 17 is shifted from the first to the second axial position is sufficient to receive the storage formed by the upper panel member 37 when being pivoted to the second horizontal position.

Further, it is neither complicated nor time-consuming to change this embodiment of the cabin arrangement from the first configuration to the second configuration. Therefore, it is easily possible to gain either more storage, e.g. for additional catering food for longer trips, or additional seats by unfolding the foldable seats 11 when the storage is not required. Thus, even during a stopover, the cabin arrangement can quickly be changed from one to the other configuration and adapted to the actual requirements in terms of storage needed in the cabin.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A partition element for an aircraft cabin, comprising:
   a wall member having a lower edge and extending upwards from the lower edge, wherein the lower edge is provided with a coupling arrangement that is configured for slidingly engaging a guide rail arrangement in a floor;
   an upper panel member pivotably mounted on the wall member with respect to a horizontal axis which is spaced from the lower edge;

wherein the upper panel member is pivotable between a first position in which the upper panel member extends from the horizontal axis towards the lower edge parallel to the wall member, and a second position in which the upper panel member extends away from the wall member; and a support member movably mounted on the wall member such that the support member is movable between a support position in which the support member supports the upper panel member when being in the second position to prevent the upper panel member from pivoting towards the wall member to the first position, and a storage position in which the support member extends parallel to the wall member.

2. The partition element according to claim 1, wherein the wall member comprises an upper edge opposite to the lower edge, and wherein the upper edge comprises a fixing device capable of being fixed to a support element above the wall member.

3. The partition element according to claim 1, wherein the support member is formed as a first lateral panel member pivotably mounted on the wall member with respect to a first pivot axis extending perpendicularly to the horizontal axis, the first lateral panel member being arranged between the horizontal axis and the lower edge.

4. The partition element according to claim 3, wherein the first pivot axis is aligned with a first lateral edge of the upper panel member.

5. The partition element according to claim 3, wherein a second lateral panel member is provided which is pivotably mounted on the wall member with respect to a second pivot axis, wherein the second pivot axis is aligned with a second lateral edge of the upper panel member opposite to the first lateral edge.

6. The partition element according to claim 3, wherein a length of the first and/or second lateral panel members perpendicular to the pivot axis of the respective lateral panel member corresponds to a length of the upper panel member perpendicular the horizontal axis.

7. The partition element according to claim 3, wherein the lower edges of first and/or second lateral panel members are parallel to the lower edge of the wall member.

8. The partition element according to claim 3, wherein the first and/or the second lateral panel members are provided with engagement devices which are adapted to be releasably coupled with engagement elements in the floor.

9. The partition element according to claim 3, wherein a frame comprising an upper frame member is attached to the wall member, wherein the upper panel member is pivotably coupled with the upper frame member so that the horizontal axis is spaced from the wall member.

10. The partition element according to claim 9, wherein the frame comprises a first lateral frame member which extends perpendicularly to the upper frame member and is aligned with a lateral edge of the upper panel member, wherein the first lateral panel member is pivotably coupled with the first lateral frame member so that the pivot axis of the first lateral panel member is spaced from the wall member by a distance different from the distance between the horizontal axis and the wall member.

11. The partition element according to claim 10, wherein the frame comprises a second lateral frame member which extends parallel to the first lateral frame member and is aligned with a second lateral edge of the upper panel member opposite to the first lateral edge.

12. An aircraft cabin arrangement comprising:
a floor with a guide rail arrangement extending along a longitudinal axis defined by the cabin arrangement;
a plurality of seat rows, each row comprising at least one seat and being arranged on the floor perpendicularly to the longitudinal axis, wherein the seat rows are arranged one after another;
a partition element according to claim 1, wherein the coupling arrangement slidingly engages the guide rail arrangement and the horizontal axis is arranged parallel to the floor;
at least one row of foldable seats comprising at least one foldable seat and being arranged on the floor perpendicularly to the longitudinal axis,
wherein the foldable seats comprise a seating area and a back rest,
wherein the foldable seats are adapted such that they can be folded and unfolded between a collapsed state in which the seating area extends parallel to the back rest, and an unfolded state in which the seating area ex-tends in a plane parallel to the floor,
wherein the at least one row of foldable seats is arranged between the plurality of seat rows and the partition element.

13. The aircraft cabin arrangement according to claim 12, wherein the partition element is slidable along the guide rail arrangement between a first axial position and a second axial position and wherein the cabin arrangement may assume first and second configurations;
wherein in the first axial position the partition element is spaced from the plurality of seat rows by a first distance and in the second axial position by a second distance, the second distance being smaller than the first distance,
wherein in the first configuration the partition element is in the first axial position and the foldable seats of the at least one row of foldable seats are in the unfolded state, and
wherein in the second configuration the partition element is in the second axial position and the foldable seats of the at least one row of foldable seats are in the collapsed state.

14. The aircraft cabin arrangement according to claim 13, wherein a difference between the first and the second distances is equal or greater than the length of the upper panel member perpendicular to the horizontal axis.

* * * * *